United States Patent

Chertok

[15] 3,662,353

[45] May 9, 1972

[54] STORING DIGITAL DATA ON A RECORDING DISK WITH THE DATA TIME BASE PROPORTIONAL TO DISK ANGULAR VELOCITY

[72] Inventor: Allan B. Chertok, Bedford, Mass.

[73] Assignee: EG&G, Inc., Bedford, Mass.

[22] Filed: June 1, 1970

[21] Appl. No.: 41,992

[52] U.S. Cl. ....................340/173 R, 178/6.6 P, 179/100.4 D

[51] Int. Cl. ..................G11b 3/36, G11b 27/12, G11c 13/00

[58] Field of Search .............178/6.6 P; 340/174.1 A, 173 R; 179/100.3 V, 100.4 D

[56] References Cited

UNITED STATES PATENTS

| | | | |
|---|---|---|---|
| 2,926,341 | 2/1960 | Scarbrough | 340/174.1 A |
| 3,041,585 | 6/1962 | Wolfe | 340/174.1 A |
| 3,371,156 | 2/1968 | Frohbach | 179/100.3 V |
| 3,391,255 | 7/1968 | Gregg | 179/100.3 V |

*Primary Examiner*—Bernard Konick
*Assistant Examiner*—Stuart Hecker
*Attorney*—Kenway, Jenney & Hildreth and Ralph L. Cadwalader

[57] ABSTRACT

A method for inscribing a modulated spiral groove on a memory disk in which a turntable is rotated at a nominally constant rotational velocity and a digital angular encoder is fixed to the shaft of the turntable providing a stream of output pulses which varies proportionally to variations in the angular velocity. This stream of output pulses is compared in a phase comparator with a stream of pulses derived from a voltage controlled oscillator and the output from the phase comparator is applied as the control input to the voltage controlled oscillator, thereby forming a phase locked loop. The output from the voltage controlled oscillator is divided down by appropriate amounts to provide timing digital signals to control the period of the modulation waveforms applied to a cutting head, which is inscribing a spiral groove on the memory disk. The output from the voltage controlled oscillator may also be used to control the radial position of the cutting head, thereby controlling the pitch of the spiral.

8 Claims, 4 Drawing Figures

INVENTOR
ALLAN B. CHERTOK
BY Kenyon Kenyon Reilly Carr & Chapin
Ralph L. Cadwallader
ATTORNEYS INVENTOR
ALLAN B. CHERTOK
BY Kenway, Jenney & Hildreth
Ralph L. Cadwallader
ATTORNEYS

STORING DIGITAL DATA ON A RECORDING DISK WITH THE DATA TIME BASE PROPORTIONAL TO DISK ANGULAR VELOCITY

FIELD OF THE INVENTION

This invention relates in general to an apparatus and method for storing digital data on a grooved disk and more particularly for inscribing a modulated spiral groove on a disk with the modulation period from one concentric turn to the next being radially coherent.

BACKGROUND OF THE INVENTION

Techniques and apparatus for utilizing a phonograph record as a digital storage memory are described in U.S. Pat. application Ser. No. 788,441 filed Jan. 2, 1969 and Ser. No. 817,068 filed Apr. 17, 1969, both assigned to the assignee of this application. In the technique described a phonograph record is used as a random access digital storage memory by inscribing on the record a spiral groove with transverse modulations in the groove representing the stored digital data.

To produce a disk of this type, the digital data to be stored is first placed in an order so that it will be distributed along the spiral groove in a known sequence. This data is then, used to generate a series of superposed waveforms in a symbol synthesizer unit, and the output analog voltage from this unit is applied to the audio input of a conventional phonograph cutting lathe. The clock used to control the symbol synthesizer is also inscribed in the spiral groove as a sinusoid to provide a time base. The waveform produced by the symbol synthesizer is such that the resulting analog voltage may be sampled at precise times, again controlled by the clocking sinusoid, and the amplitude at these sampling times is indicative of the digital value provided to the synthesizer at a corresponding clocking time. In one example, as described in Patent application Ser. No. 788,441, the digital data is in the form of a series of binary bits and the amplitude determination must determine only whether the amplitude is such as to be categorized at a logical zero or a one level. The cutting lathe includes a turntable which is rotated at a selected velocity, nominally constant, and the disk being inscribed is placed on this turntable. The cutting lathe also has a variable pitch control which controls the radial movement of the cutting head across the record and therefore the pitch of the spiral. The audio input, of course, controls the transverse modulations produced by the cutting head. It will be understood that the disk prepared in this fashion is a master disk which can then be used in the conventional phonograph replicating process to produce many copies.

The random access data retrieval system for a memory disk prepared in the above described fashion includes a conventional phonograph turntable and cartridge. Each of the spiral turns on the disk, or sectors of these turns, are ascribed addresses and the digital data stored on the disk is ordered in such a fashion that it can be stored in a known address or location. In order to access this location to retrieve the data stored, a conventional phonograph cartridge is mounted to be moved from a home position to a specific radial position over the record. The turntable is then actuated with the cartridge engaged in the groove, the modulations of the groove reproducing through the phonograph cartridge the electrical waveform which had been applied to the cutter to inscribe those modulations.

As in any digital memory and retrieval systems, there are a number of characteristics which affect the quality and value of the system. These factors include the probability of making an error in either storing the digital information or in retrieving it, the storage density, the average access time required from entry of an address to retrieval of the information stored at that address, and the cost factors associated both with the process of storing the information in the memory and the retrieval of the information from the memory. In the method described above, one source of inaccuracy is the variation in rotational velocity of the turntable in the cutting lathe. Since the data is being controlled by a clocking pulse train, the superposed series of waveforms applied to the audio input of the cutting lathe have a fixed period on a time basis. Variations in rotational velocity will then result in a variation in the angular distribution of modulations in the spiral groove representing data bits; stated otherwise, the data bits recorded on the disk will not have a constant angular distribution and hence one turn of the spiral may contain a larger number of bits than turns further out or further in on the disk. Since this error may be cumulative, it may be that data which should be located at an address ascribed to turn 450, is in fact located in turn 451.

In the conventional cutting lathe, the cutting head radial position is varied by the cutting head being mounted on a lead screw which is driven through a coupling from the turntable rotation, thereby moving the cutting head radially inward as the turntable is rotated. To the extent that this coupling ratio varies, variations in the pitch of the spiral groove will also occur. The first type of error, that is displacement of the data bits along the spiral, can be compensated for in the retrieval process by always engaging the cartridge at a turn substantially further out than that corresponding to the entered address. Thus as the cartridge tracks along the spiral groove it will eventually reach the correct address. Such a compensation, however, introduces additional access time. In fact, retrieval systems in most cases, already provide that the cartridge is engaged at a point a few turns beyond the address location in order to allow reasonable tolerances on the mechanics of the mechanism for moving the cartridge. To introduce a further requirement of displacing the cartridge from the actual address requires either an acceptance of an increased access time or increased cost in improving the precision of the cartridge moving mechanism. With respect to the errors in spiral pitch, one type of address system moves the cartridge a fixed radial distance, based upon the presumption of constant pitch. Thus if the pitch is variable, the cartridge will have moved to a position which does not correspond to the addressed turn. Using the conventional cutting lathe and manual velocity correction techniques, the pitch of the spiral can be controlled to approximately 2 percent and the data distribution controlled to an accuracy of approximately 180° in 500 revolutions.

BRIEF SUMMARY OF THE INVENTION

Broadly speaking, the present invention includes a method and apparatus in which a conventional cutting lathe is used to inscribe the spiral groove on a recording disk. A digital angular encoder is, however, mounted on the shaft of the turntable and produces a train of output pulses which varies in direct proportion to variations in the rotational velocity of the turntable. A voltage controlled oscillator is used to generate a series of pulses, which are divided down by conventional digital dividers, to a frequency nominally the same as the frequency of the pulses produced by the angular encoder. The pulses from the angular encoder are applied as one input to a phase comparator circuit and the pulses derived from the voltage controlled oscillator are applied to the other input, the output signal from the phase comparator being applied as a control voltage to the voltage controlled oscillator. The overall circuit is then a phase locking loop which servos the frequency and phase of the voltage controlled oscillator to the pulses produced from the angular encoder so that variations in the rotational velocity of the turntable produce corresponding variations in the time distribution of pulses from the voltage controlled oscillator. Pulses from the voltage controlled oscillator, divided down by an appropriate amount, are used as the clocking signals to control the generation of the analog symbols representing the digital data and are also recorded directly onto the disk as clock sinusoid to provide a time base for sampling the regenerated electrical waveform in the phonograph playback apparatus. Since the relation between angular velocity and the spacing of these clocking pulses remains fixed irrespective of changes in angular velocity, the angular distribution of data bits inscribed on the record will remain constant. Each turn or angular sector will, therefore, contain the same number of data bits, without regard to its radial position. The output pulses from the voltage controlled oscillator, once again divided down by an appropriate factor, are also used to control a stepping motor to rotate the lead screw which controls the radial position of the cutting head, producing a spiral groove at a precise pitch. While the method and apparatus are described with respect to a conventional cutting lathe, it will be apparent that a similar apparatus may be constructed in which the modulations are impressed upon the record other than by physically inscribing a groove, for example, the mobile head may contain a light source which is positionly modulated to expose a modulated spiral path on an emulsion coating on a disk.

DESCRIPTION OF PREFERRED EMBODIMENTS

Figure 1:
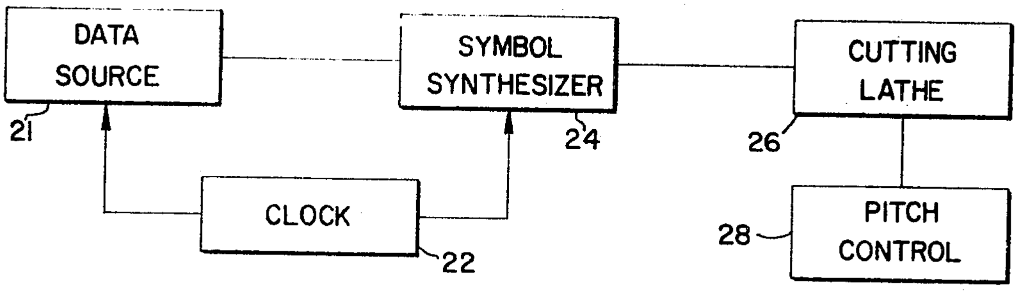
FIG. 1 is an illustration in block diagrammatic form of a system for recording digital data on a record disk.

Referring now to FIG. 1 there is illustrated a general system for inscribing a modulated spiral groove on a record to represent a train of digital data. A data source 21 contains the digital data to be recorded in an appropriate order. The data source may, for example, consist of a computer which has been programmed to release, upon demand from clocking signals, the digital data to be stored in an appropriate order for distribution in a known pattern along the spiral groove. A clock element 22 supplies clocking pulses to the data source 21 to release the digital data and also provides clocking pulses to a symbol synthesizer unit 24. The digital data train from data source 21 is provided at the input to this unit. In general the symbol synthesizer 24 includes a pre-coder unit and a waveform generating unit which generates, in response to the applied data train, a series of superposed waveforms at its output. The form of the symbol synthesizer will depend, of course, upon the particular waveform selected. A suitable synthesizer for an appropriate waveform is described in the above referred to U.S. application Ser. No. 788,441.

In general the synthesizer described therein utilizes a clocking pulse at twice the frequency at which the data is being supplied. Thus for such an arrangement the clock 22 would have to provide clocking pulses at one frequency to the data source 21 and at twice that frequency to the symbol synthesizer 24. The output of the symbol synthesizer is an analog voltage signal which is applied to the audio input of a conventional cutting head 26. A suitable head for this purpose is a Westrex Model 3D cutter and amplifier for stereo cutting, wired to cut lateral monaural without RIAA compensation. In general the cutting lathe 26 includes a turntable which can be operated at selected rotational speeds, such as 45 RPM, 22.5 RPM and the like and the master disk to be recorded is placed on this turntable. In addition, the cutting lathe includes the cutting head, which is mounted on a lead screw arrangement for radial traversal as the turntable rotates. The pitch of the spiral groove which is inscribed can be varied by a pitch control unit 28. A typical value is 0.0033 inches per revolution. In the usual cutting lathe arrangement, the pitch is produced by the movement of the cutting head along a lead screw which, in turn, is belt driven from the shaft of the turntable.

Figure 3:
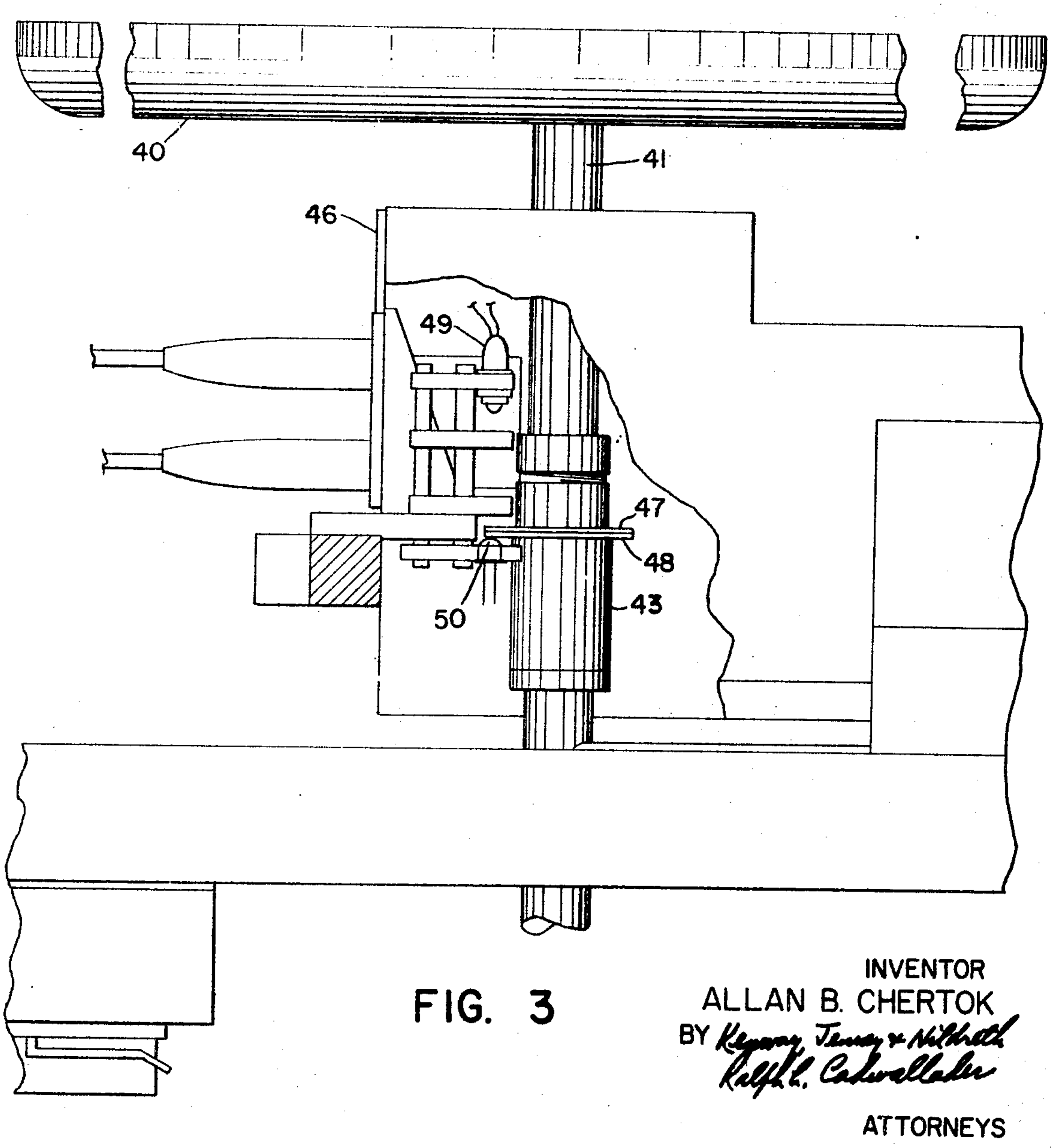
FIG. 3 is an illustration in perspective view of a turntable portion of a cutting lathe suitable for employment in a system of FIG. 2.
Figure 2:
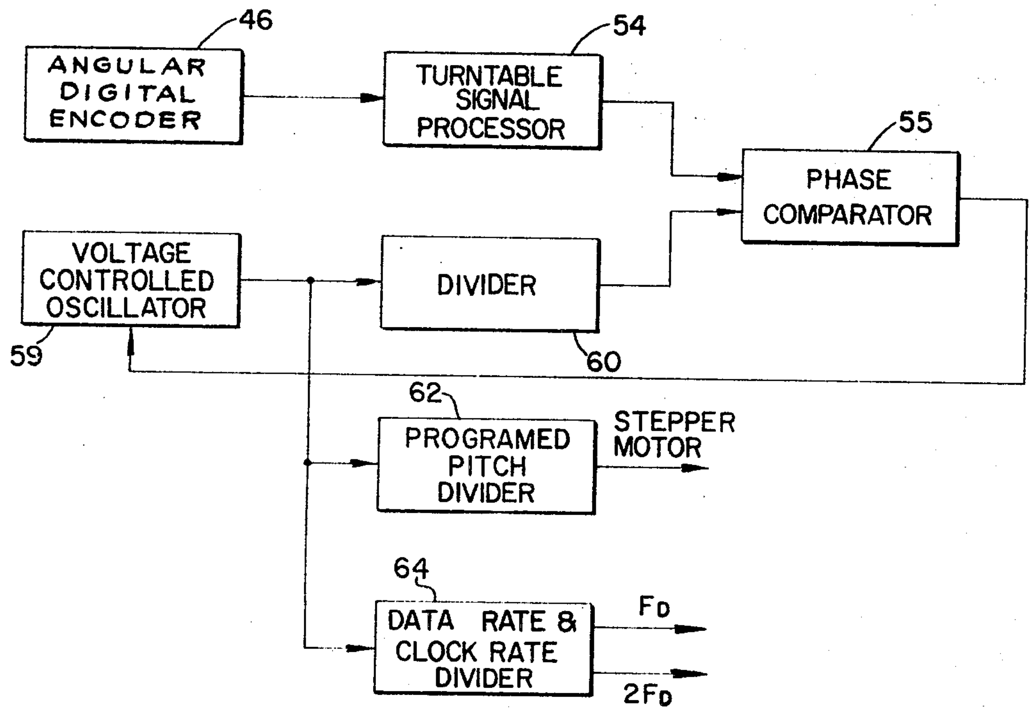
FIG. 2 is an illustration in block diagrammatic form of an apparatus constructed in accordance with the principles of this invention for precisely recording digital data on a recording disk.

In FIG. 2, there is illustrated a modification of the apparatus of FIG. 1 in which the clock 22 is replaced by the network shown. As is more clearly illustrated in FIG. 3, the turntable 40 is rotated by means of a shaft 41 which is driven from a turntable drive element (not shown). Mounted on the shaft 41 and concentric with it is an angular digital encoder 46, which is formed of a pair of closely spaced optical disks 47 and 48, positioned with a small space between them. These disks have alternatively light opaque and transmissive sectors. One disk 47 is fixed to shaft 41 and rotates with it, while the other disk 48 is mounted on a bushing 43 and remains mechanically fixed. A light source 49 and photocell 50 are positioned on either side of the pair of disks, so that rotation of the upper disk 47 produces a modulated electrical signal from the photocell 50, which signal is applied to turntable signal processor 54. Encoder disks of this type are commercially available, one example being an encoder disk sold by Dynamics Research Corporation of Stoneham, Massachusetts.

The output from the turntable signal processor 54 is a series of pulses produced in response to the modulated signal from the photocell 50, the frequency of which varies with variations in the speed of rotation of the turntable 40. The signal processor 54 is, in general, a circuit for producing a series of pulses from the optical encoder 46, many such circuits being known in the art. The output signals from the turntable signal processor 54 are applied to one input of a phase comparator circuit 55. The second input to the phase comparator unit 55 is supplied through divider 60 from the voltage controlled oscillator 59. The voltage controlled oscillator 59 may be any one of several commercially available units, that manufactured by Damon Corporation of Needham, Massachusetts under the designation 64–77WA, being a suitable example. In general the voltage controlled oscillator provides an output signal having a frequency which is precisely related to the value of the input control voltage. This signal output from the voltage controlled oscillator 59 is divided down by a conventional pulse divider 60, which may for example be a counter. The division factor of the divider is selected so that dividing the nominal center frequency of the voltage controlled oscillator by this factor will produce an output signal from the divider 60 of a frequency which is generally matched to the frequency of the turntable signal processor 54 output at the nominal rotational velocity of the turntable.

The phase comparator unit 55 provides as an output signal a voltage, the value of which varies in accordance with the quantity and direction of the difference in phase between signals received from the turntable processor 54 on one input and from the divider 60 on the other input. The output of this phase comparator 55 is applied to the control input of the voltage controlled oscillator 59. The undivided output from the voltage controlled oscillator 59 is applied as the input to a programmed pitch divider 62. The data rate and clock rate divider 64 divides down the output from the voltage controlled oscillator to produce the data rate $F_D$ and the clock signal at twice the data rate $2F_D$. The divider value is selected so that at the nominal center frequency of the voltage controlled oscillator 59, the rate $F_D$ is one which is the desired data rate and one which falls within the filter envelope used to separate the clock sinusoid from the data carrying information. The programmed pitch divider 62 divides the oscillator output signal 59 down to a frequency rate which is appropriate to drive a stepper motor 76, the latter element being used to rotate through positive drive 77, 79, 82 the lead screw 75 carrying the cutter head of the lathe.

In operation, then, rotation of the turntable 40 produces a pulse train to the phase comparator, which is receiving on its other input a pulse train derived from the voltage controlled oscillator 59. The application of the output signal from the phase comparator 55 to the control input of the voltage control oscillator 59 forms a feedback loop which maintains the divided output from the voltage controlled oscillator 59 in phase with, and frequency locked to, the signal rate from the turntable signal processor 54. This network will operate using a phase comparator 55 as the servo error detector as long as the rate from the turntable signals 54 is reasonably close to the output rate from the divider 60, for example within 0.3 percent.

Figure 4:
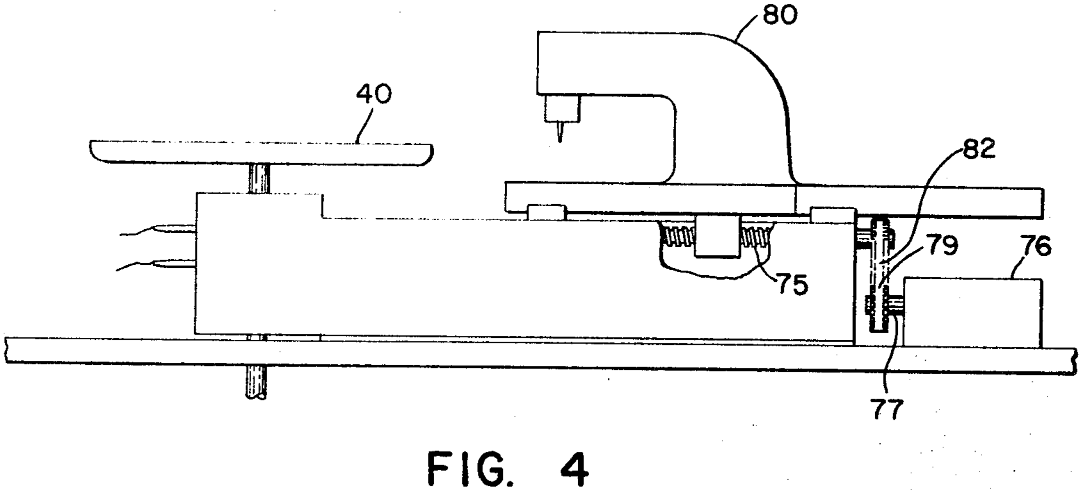
FIG. 4 is an illustration in perspective view of the pitch control mechanism for a cutting lathe to be employed in the apparatus illustrated in FIG. 2.

In a specific numerical example, where it is desired to have a data rate of 7.8 kHz and a nominal turntable rotation velocity of 45 RPM, a pair of optical disks having 1440 lines produces an input to the phase comparator 55 of 1440 pulses per revolution. If the voltage controlled oscillator is selected to have a center frequency of 1,250,640 Hz, then the divider 60 must have a division factor of 1158, producing an output frequency from the divider 60 of 1080 Hz, corresponding to 1440 cycles per revolution at 45 RPM. The output from the voltage controlled oscillator is divided down by 80 at the clock rate divider to produce an output clock rate, $2F_D$, of 15.663 kHz. Halving this frequency within the divider produces a data rate output of 7.816 kHz. from the data rate divider 64. As will be explained in more detail in the description below, in conjunction with FIG. 4, the lead screw 75 which carries the cutter head 80 is driven by a stepper motor 76 which requires 500 pulses per second for a motor shaft rotation of 300 RPM. For a pitch of 0.0033 inches per revolution, the control pitch divider must have a division factor of 2204, producing an output pulse rate of 567.5 Hz. or 756.6 pulses per turntable revolution. The output of the stepper motor 76 is geared down to produce from this applied pulse rate an output shaft rotation of 5.6 revolutions per second. The geared down output 77 from the stepper motor 76 is used to drive a cog wheel 79 which is coupled through a perforated belt 82 to the lead screw 75. Thus the drive controlling the pitch of the spiral is precisely and positively controlled.

Utilizing the technique and method of this invention the data pitch has been controlled to an accuracy of 10° in 500 turns and the mechanical pitch is controlled less than a fraction of 1 percent.

As earlier indicated, while the method has been described in terms of a spiral cutting lathe, it could apply equally well to any other technique for cutting a generally circular configuration of path on the rotating disk, where it is desired to maintain the modulations in the path in precise angular orientation.

I claim:

1. Apparatus for inscribing a modulated path including generally circular and concentric segments on a disk comprising, a turntable for supporting said disk;

means for rotating said turntable at a selected rotational velocity;

a digital angular encoder mounted to sense the rotation of said turntable and producing a series of output pulses, the spacing of said pulses being precisely related to the rotational velocity of said turntable;

an inscribing head for inscribing a path on said record;

first control means responsive to control signals for controlling the radial position of said inscribing head;

second control means for modulating the position of said inscribing head in response to applied analog signals at a generally periodic rate;

a generator for analog signals providing, in response to applied clocking pulses a superposed series of analog waveforms to said second control means;

a controlled frequency oscillator providing on an output terminal a series of pulses at a frequency which varies in accordance with a signal supplied at a control input;

a phase comparator having first and second inputs and providing an output signal which varies in value in proportion to differences in phase of signals applied to said first and second inputs;

means coupling the output of said oscillator to one input of said phase comparator and means coupling the output of said digital angular encoder to the other of said inputs of said phase comparator; the output signal from said phase comparator being coupled to the control input of said oscillator; and means coupling the output pulses from said oscillator to said generator for analog signals as a supply of clocking pulses.

2. Apparatus for inscribing a modulated spiral groove on a disk comprising, a turntable for supporting said disk;

means for rotating said turntable at a selected rotational velocity;

a digital angular encoder mounted to sense the rotation of said turntable and producing a series of output pulses, the spacing between said pulses being precisely related to the rotational velocity of said turntable;

an inscribing head for inscribing a groove on said disk;

first control means responsive to electrical control signals for controlling the radial position of said inscribing head as said turntable rotates to inscribe a spiral groove at a selected pitch;

second control means for modulating the position of said inscribing head in response to variations in applied analog signals varying at a generally periodic rate;

a generator for analog signals providing, in response to applied clocking pulses, a superposed series of analog waveforms to said second control means; the period of said waveforms being controlled by said clocking pulses, a controlled frequency oscillator providing on an output terminal a series of pulses at a frequency which varies in accordance with the signal supplied at a control input;

a phase comparator having first and second inputs and providing an output signal which varies in value in proportion to differences in phase signals applied to said first and second inputs;

means coupling the output of said oscillator to one input of said phase comparator and means coupling the output of said digital angular encoder to the other of said inputs of said phase comparator; the output of said phase comparator being coupled to the control input of said oscillator; and means coupling the output pulses from said oscillator to said generator of analog signals as a supply of clocking pulses.

3. Apparatus in accordance with claim 2 wherein said digital angular encoder is an optical encoder having a first disk fixed to the shaft of said turntable and a second disk fixed to a point of mechanical reference.

4. Apparatus in accordance with claim 2 wherein said controlled frequency oscillator is a voltage controlled oscillator.

5. Apparatus in accordance with claim 2 wherein said oscillator has a nominal center frequency at a frequency substantially higher than output frequency of pulses from said digital angular encoder at the selected rotational velocity of said turntable and wherein said means coupling the output from said oscillator to the input of said phase comparator includes a first divider means for dividing the frequency of the output signals from said oscillator by a factor such that the signals from said divider to the input of said phase comparator are substantially equal to the frequency of the pulses from said digital angular encoder at said selected turntable velocity.

6. Apparatus in accordance with claim 5 and further including a second divider means coupling the output from said oscillator and to said first control means to control the pitch of said spiral by the frequency of pulses received from said divider.

7. Apparatus in accordance with claim 6 wherein said first control means includes a stepper motor providing rotation of an output shaft at a velocity which varies with variations in the frequency of pulses supplied to said stepper motor.

8. A method for inscribing a modulated spiral groove on a disk, the modulations representing digital data to be stored, comprising the steps of:

placing the disk to be inscribed on a turntable rotating at a selected rotational velocity;

providing a first pulse train at a frequency proportional to the rotational velocity of said turntable;

generating from an independent source a second train of pulses; maintaining the frequency of the second train of pulses in fixed relationship to and substantially higher than the frequency of said first pulse train generating at a rate controlled by said second train of pulses a series of analog waveforms representing said digital data, and applying said series of waveforms to the modulation input of a cutting lathe to inscribe the groove on said disk.

* * * * *